United States Patent
Araman

(10) Patent No.: US 9,482,422 B2
(45) Date of Patent: Nov. 1, 2016

(54) OUTDOOR LIGHTING DEVICE

(71) Applicant: Antoine Araman, Beyrouth-Maten (LB)

(72) Inventor: Antoine Araman, Beyrouth-Maten (LB)

(*) Notice: Subject to any disclaimer, the term of this patent is extended or adjusted under 35 U.S.C. 154(b) by 165 days.

(21) Appl. No.: 14/054,577

(22) Filed: Oct. 15, 2013

(65) Prior Publication Data

US 2014/0104859 A1 Apr. 17, 2014

(30) Foreign Application Priority Data

Oct. 16, 2012 (FR) .................................... 12 59843

(51) Int. Cl.
| | | |
|---|---|---|
| *F21V 29/00* | (2015.01) | |
| *F21V 29/507* | (2015.01) | |
| *F21V 29/02* | (2006.01) | |
| *F21V 29/74* | (2015.01) | |
| *F21V 29/67* | (2015.01) | |
| *F21S 8/08* | (2006.01) | |
| *F21S 9/03* | (2006.01) | |
| *F21V 29/77* | (2015.01) | |
| *F21W 131/10* | (2006.01) | |
| *F21W 131/103* | (2006.01) | |
| *F21Y 101/00* | (2016.01) | |

(52) U.S. Cl.
CPC .............. *F21V 29/507* (2015.01); *F21S 8/086* (2013.01); *F21S 9/032* (2013.01); *F21V 29/02* (2013.01); *F21V 29/67* (2015.01); *F21V 29/673* (2015.01); *F21V 29/74* (2015.01); *F21V 29/77* (2015.01); *F21W 2131/10* (2013.01); *F21W 2131/103* (2013.01); *F21Y 2101/00* (2013.01); *Y02B 20/72* (2013.01)

(58) Field of Classification Search
CPC .................. F21V 29/59–29/677; F21V 29/02; F21V 29/004; F21V 15/011
USPC ........... 43/64–67, 106–127; 353/52–61, 119; 136/126, 243–163, 259; 126/569–713; 165/903; 250/239
See application file for complete search history.

(56) References Cited

U.S. PATENT DOCUMENTS

| | | | |
|---|---|---|---|
| 3,784,808 A * | 1/1974 | Mori .............................. | 362/294 |
| 6,941,361 B1 * | 9/2005 | Fink et al. ..................... | 709/223 |
| 6,942,361 B1 * | 9/2005 | Kishimura .............. | F21S 8/086 |
| | | | 362/240 |
| 7,143,762 B2 * | 12/2006 | Harrison et al. .............. | 126/589 |
| 2004/0187861 A1 * | 9/2004 | Harrison .................... | F24J 2/20 |
| | | | 126/651 |

(Continued)

FOREIGN PATENT DOCUMENTS

| | | |
|---|---|---|
| EP | 2 169 302 A1 | 3/2010 |
| GB | 2464518 A | 4/2010 |
| KR | 10-0823184 B1 | 4/2008 |

OTHER PUBLICATIONS

INPI Search Report for corresponding application FR 1259843 dated Jun. 28, 2013 (2 pages).

*Primary Examiner* — Renee Chavez
*Assistant Examiner* — Christopher E Dunay
(74) *Attorney, Agent, or Firm* — Bookoff McAndrews, PLLC

(57) ABSTRACT

An outdoor lighting device with cooled LEDs comprises a housing carrying a radiator and a light-emitting diode that is thermally coupled to the radiator, and the radiator is arranged along a passage that is protected from solar radiation and in which a flow of air is established.

21 Claims, 3 Drawing Sheets

(56) References Cited

U.S. PATENT DOCUMENTS

| | | | |
|---|---|---|---|
| 2009/0180289 A1* | 7/2009 | Hsu | 362/373 |
| 2010/0053966 A1* | 3/2010 | Tu et al. | 362/249.02 |
| 2010/0135025 A1 | 6/2010 | Chien et al. | |
| 2010/0290237 A1* | 11/2010 | Chien et al. | 362/373 |
| 2011/0038165 A1* | 2/2011 | Hsu et al. | 362/373 |
| 2011/0157894 A1* | 6/2011 | Lai | 362/249.02 |
| 2012/0069571 A1* | 3/2012 | Hochstein | 362/249.02 |
| 2014/0036521 A1* | 2/2014 | Elliott | 362/459 |

* cited by examiner

OUTDOOR LIGHTING DEVICE

CROSS-REFERENCE TO RELATED APPLICATIONS

This application claims priority under 35 U.S.C. §119 to French Patent Application No. FR 1259843, filed Oct. 16, 2012, the contents of which are incorporated by reference herein.

FIELD OF THE INVENTION

The present specification relates to an outdoor lighting device using one or more light-emitting diodes (LEDs). The specification relates more particularly to outdoor public lighting, now that the power and brightness of LEDs is compatible with such use. The present specification seeks above all to guarantee long life for LEDs, in particular when such a lighting device is installed in a location having a large amount of sunlight, where daytime ambient temperature may reach high values, possibly close to 50° C. to 55° C.

BACKGROUND OF THE INVENTION

Whatever the kind of lighting device, if it is exposed to sunlight in a hot country, it can store heat during the daytime because of its mass. Its temperature can therefore be considerably higher than that of the ambient air. A particular problem appears when the lighting member used is constituted by one or more LEDs. An LED must be operated at a temperature lower than a given maximum value, e.g. of the order of 80° C. to 90° C. Consequently, in the evening, when the lighting device is put into operation, an LED in the lighting device might be switched on while it is at a temperature that is too high, which can lead to irreversible damage or even destruction, and which, in any event, considerably shortens its lifetime.

OBJECT AND SUMMARY OF THE INVENTION

An object of the present specification is to avoid that drawback and consequently to enable LEDs to be used effectively for outdoor lighting, while proposing a device that is simple and self-contained, requiring little or even no maintenance.

The idea on which the present specification is based consists in coupling the LED thermally with a heat exchange radiator, and in protecting the radiator from direct solar radiation during the daytime, while organizing a flow of air along said radiator, which air is relatively cool, being at a temperature that is close to that of ambient air, in order to ensure that the LED coupled to its radiator does not reach a high temperature exceeding the maximum acceptable value.

For this purpose, an aspect of the present specification relates to an outdoor lighting device having at least one light-emitting diode. Said device comprises a housing carrying said light-emitting diode and provided with a heat exchange radiator. Said light-emitting diode is thermally coupled to said heat exchange radiator. Said radiator is arranged along a passage that is protected from solar radiation and that extends between an air inlet and an air outlet. The device is configured to create a flow of air in said passage between said inlet and said outlet.

In certain embodiments, said heat exchange radiator may have a first group of fins extending into said passage.

In certain embodiments, the housing may be arranged so that said air inlet is situated at a level that is lower than the level of said air outlet. Thus, at night, the heat given off by the LED can be communicated to the radiator and can be exhausted via an upward flow of air created by heating from said radiator, since the air is constrained to flow between the low inlet and the high outlet of the passage.

In certain embodiments, this slope of the passage may also contribute to creating a flow of air along the radiator in daytime.

In particular, in certain embodiments, said housing may comprise a base sheltering said radiator and said light-emitting diode, said passage that is protected from solar radiation may be defined between said heat exchange radiator and a covering that covers said radiator, the covering possibly comprising two elements, a first element made of a material that is thermally conductive and/or dark in color extending from said inlet, and a second element that is made of material that is thermally insulating and/or pale in color extending from said outlet.

In certain embodiments, the second element may cover a portion of the first element.

In certain embodiments, each element in said covering may include a folded-down margin whereby it is fastened to said base. Fastener elements, e.g. conventional clip elements, may be used for performing said fastening.

In certain embodiments, said air inlet may have a flow section that is greater than the flow section of said air outlet. Thus, the air flowing along the passage is accelerated, thereby enhancing flow along said radiator.

In certain embodiments, the housing may be generally oblong and flat in shape, and its width may decrease going from the inlet towards the outlet. This may naturally enable an inlet to be defined that is of section greater than the section of the outlet.

In certain embodiments, the fins of the radiator may converge from said inlet towards said outlet.

In certain embodiments, said first element may carry a second group of heat exchange fins interleaved between the fins of said first group of heat exchange fins.

In certain embodiments, the device may include an electrically-driven ventilation member arranged to create a flow of air in said passage that is protected from solar radiation.

In certain embodiments, the ventilation member may be powered by a photoelectric cell carried by said housing.

BRIEF DESCRIPTION OF THE DRAWINGS

The above-mentioned characteristics and advantages, together with others, appear better in the light of the following detailed description of embodiments of an outdoor lighting device in accordance with the principle of the invention, given purely by way of example and made with reference to the accompanying drawings, in which.

MORE DETAILED DESCRIPTION

Figure 1:
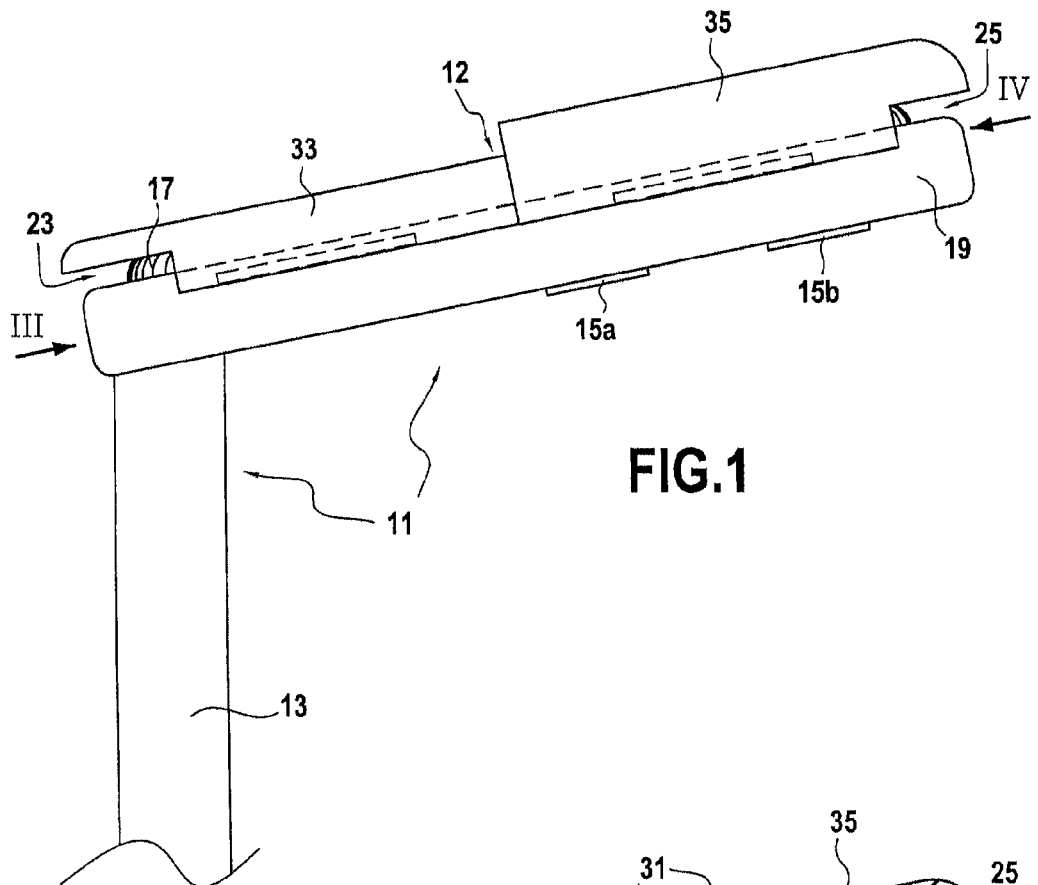
FIG. 1 is a diagrammatic elevation view of the device installed at the top of a post.
Figure 2:
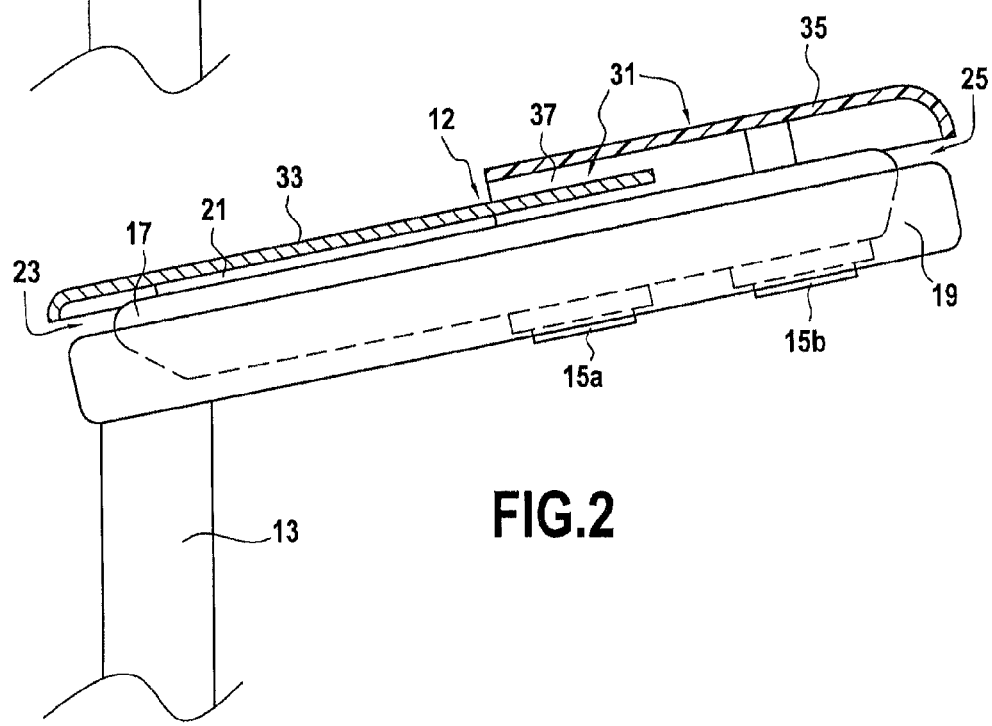
FIG. 2 is a fragmentary section view of the FIG. 1 device.

With reference to the drawings, there can be seen an outdoor lighting device 11, specifically in this example a public lighting luminaire having a housing 12 carried at the top end of a vertical post 13. The housing 12 contains at least one light-emitting diode, and specifically in this example two light-emitting diodes 15a, 15b and a heat exchange radiator 17. More precisely, and as shown in FIG. 2, the light-emitting diodes 15a, 15b are thermally coupled with the heat exchange radiator 17, which is made of metal, i.e. which has good thermal conductivity. The diodes shine downwards, since they are flush with the bottom face of the housing 12. The housing comprises a base 19 housing the radiator 17 and the light-emitting diode(s) 15a, 15b. The base may be made of a thermally insulating material in order to prevent the heat of the sun increasing the temperature of the radiator in daytime.

In this example, the radiator 17 is arranged along a passage 21 that is protected from solar radiation and it extends between an air inlet 23 and an air outlet 25. The inlet 23 and the outlet 25 are arranged at two opposite ends of the base 19. The device is also configured to create a flow of air in this passage, as described below.

In this example, the heat exchange radiator has a first group of fins 29 projecting into the passage 21 and extending between the inlet 23 and the outlet 25. In the example shown in FIGS. 1 to 7, a flow of air is created in the passage as a result both of the housing 19 having an angle of inclination and of a particular covering 31 that covers the radiator 17. More precisely, the housing 12 is arranged so that the air inlet 23 is situated at a level that is lower than the level at which the air outlet 25 is situated.

Furthermore, the base is surmounted by said covering 31 that covers the radiator and defines the passage 21. The covering comprises two elements. A first element 33 is made of thermally conductive material, e.g. of aluminum, and it is dark in color, e.g. being anodized so as to be black. This first element 33 extends from said inlet 23 and overlies a large portion of the radiator, or even the entire radiator. A second element 35 is made of thermally insulating material (plastics material) and is pale in color, e.g. white. It extends from the outlet 25 and covers a portion of the first element. The second element 35 overlies the first element 33 so that a laminar passage 37 is defined between them.

It should be observed that the first element 33 may be made of thermally conductive material and need not necessarily be dark in color, or on the contrary it may be dark in color but need not necessarily be thermally conductive. The combination of the two characteristics of being thermally conductive and of being dark in color is possible in accordance with the present specification. Likewise, the second element 35 may be made of material that is thermally insulating but that is not necessarily pale in color, or it may be made of any material providing it is pale in color. The combination of the two characteristics of being thermally insulating and of being pale in color is possible in accordance with the present specification.

Figure 3:
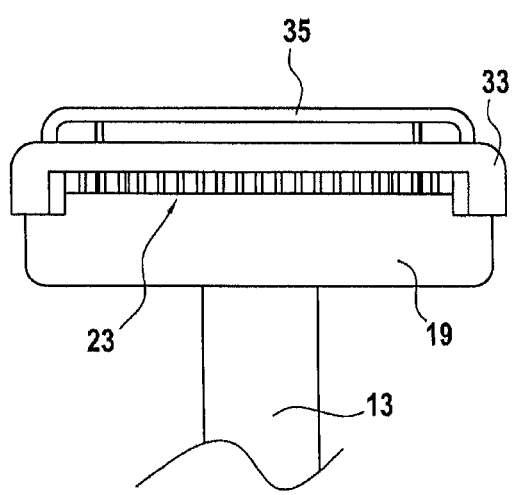
FIG. 3 is a view looking along arrow III of FIG. 1.
Figure 4:
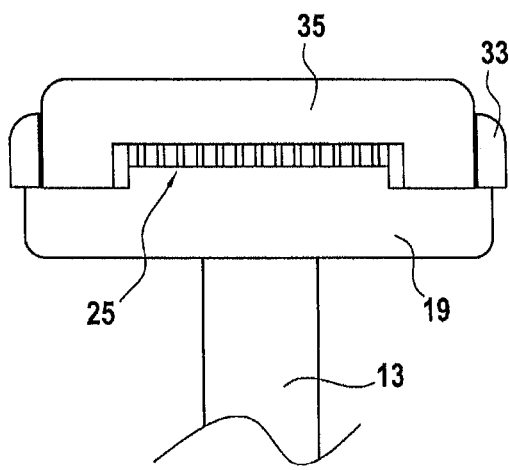
FIG. 4 is a view looking along arrow IV of FIG. 1.
Figure 5:
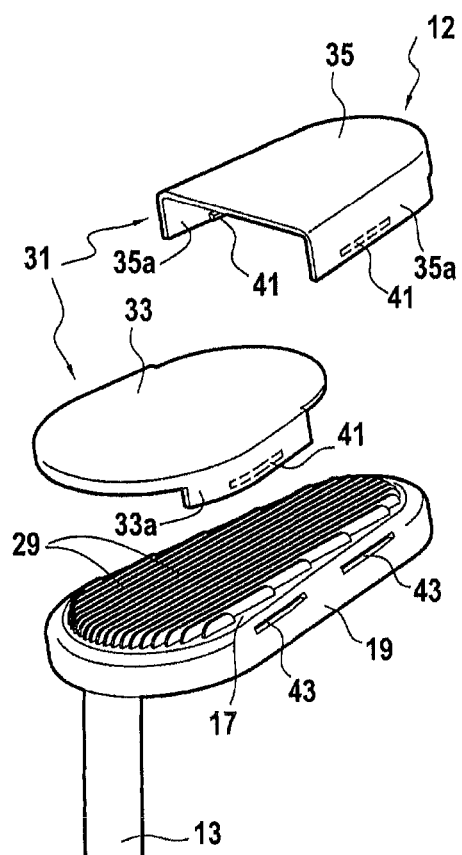
FIG. 5 is an exploded perspective view of the device.
Figure 6:
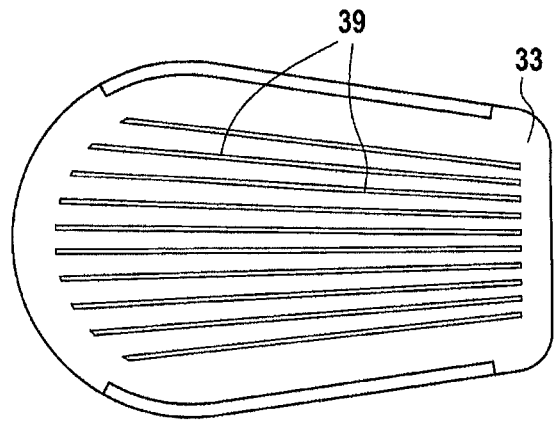
FIG. 6 shows a variant of the radiator seen from above.
Figure 7:
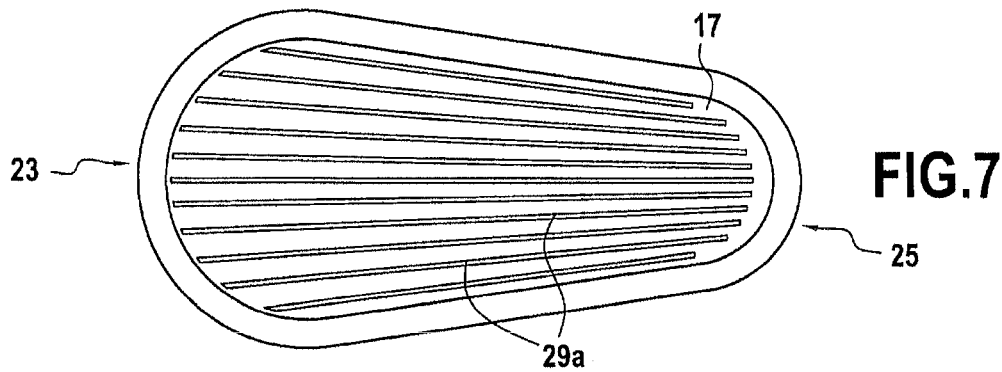
FIG. 7 shows a variant of a covering element that covers the radiator, as seen from below.

As shown, each element of said cover has folded-down margins 33a, 35a whereby it is fastened to the base. In this example, the fastener elements are clips made up of internal ribs 41 projecting from the folded down margins of the elements and co-operating with grooves 43 formed in the flanks of the base 19 (FIG. 5). As also shown in FIGS. 3 and 4, the air inlet 23 has a flow section that is larger than that of the air outlet 25.

The housing 12 is also generally oblong in shape and flat, and its width decreases going from the inlet towards the outlet, as can be seen in FIG. 5.

The light-emitting diodes 15a, 15b are powered electrically in conventional manner via electrical conductors (not shown) extending inside the post.

Operation is as follows.

In daytime, the passage 21, and consequently also the radiator, are both protected from direct solar radiation by the covering 31. Nevertheless, the lower portion of the radiator receives more heat than the upper portion, because of the different materials and/or colors of said first and second elements 33, 35 that overly the radiator 17. Consequently, a flow of air is naturally established between the inlet 23 situated at a low level and the outlet 25 situated at a high level. In other words, ambient air penetrates via the low inlet and flows to the high outlet because of the temperature gradient that is created inside the passage. This temperature gradient that drives the flow of air enables the radiator 17 to be maintained at a temperature that is relatively low, compared with the temperature that it would have if it were subjected to direct solar radiation. Even if the ambient air that penetrates via the inlet 23 heats up a little on passing along the passage, the temperature inside said passage remains moderate. Consequently, the LEDs 15a, 15b benefit from this relative cooling and during daytime they remain at a temperature that is lower than their maximum acceptable temperature. At nightfall, the LEDs may be switched on under conditions that are good from a temperature point of view. Even if the lighting device is not installed in a region that is very hot, the above-described arrangement serves, in any event, to cool the LEDs output and consequently to guarantee better light efficiency when they are put into operation.

At night, the LEDs in operation communicate their heat to the radiator, which in turn radiates into the passage, thereby sustaining the flow of cool air coming from the outside.

In the example of FIGS. 1 to 5, the fins 29 are parallel. In contrast, in the variant of FIG. 6, the fins 29a of the radiator 17 converge from the inlet 23 towards the outlet 25. Optionally, the first element 33 made of thermally conductive material carries a second group of heat exchange fins 39 projecting from its inside face, i.e. extending into the passage 21. These fins are interleaved between the fins of the first group of fins 29 of the radiator 17. This arrangement is possible with the embodiment of FIGS. 1 to 5.

In this embodiment using natural convection, a chimney effect is thus obtained by the fact that the hot air is guided in a passage that is rising, as a result in this example, of the slope of the housing 12, in particular. In such an embodiment, it is desirable for the surfaces along which the air flows to be relatively smooth, and in any event to have no protuberances that might give rise to eddies disturbing the smooth flow of air.

Figure 8:
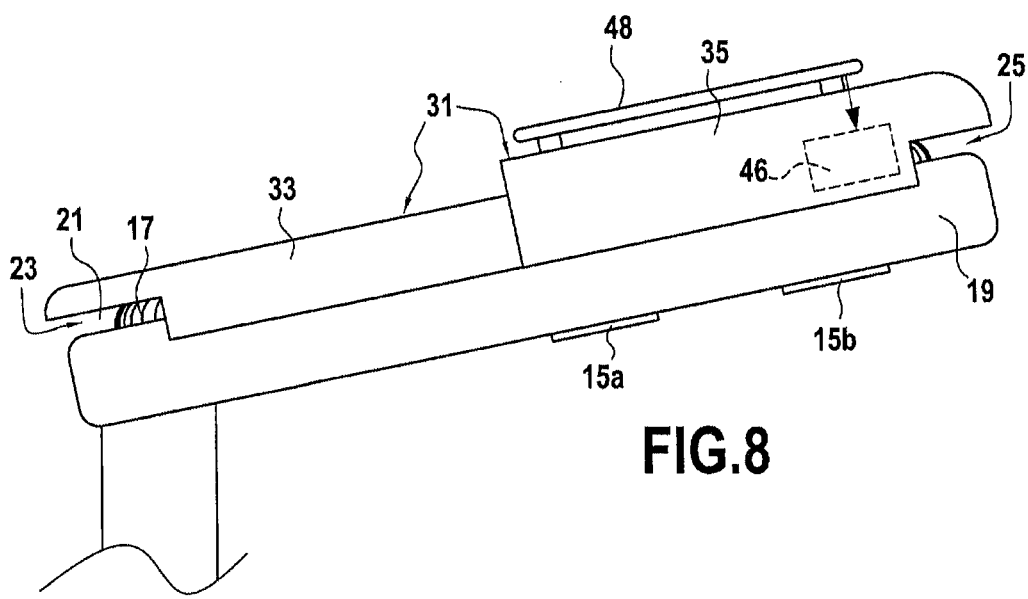
FIG. 8 shows another variant with forced air flow.

With reference to FIG. 8, in order to create a flow of air in said passage between the inlet 23 and the outlet 25, it can be seen that the device has an electrically-driven ventilation member 46 arranged to establish a flow of air in the passage 21 that is protected from solar radiation. In this example, the ventilation member is powered by a photoelectric cell 48 carried by said housing, preferably by the second element 35 of said covering. The ventilation member can thus suck air from the inlet towards the outlet, and can consequently force air to flow along the radiator 17.

As shown in FIG. 8, a given lighting device may be configured to combine both of the above-described types of flow, namely natural air flow and forced air flow as mentioned above. It is also possible to devise a device configured to make use of forced air flow only (e.g. by using the ventilation member 46 shown in FIG. 8), with a covering constituted by a single portion. The first embodiment of FIGS. 1 to 7 presents the advantage of not requiring any maintenance.

Because of the slope of the housing, in this embodiment the chimney effect continues at night and it serves above all for cooling the LED.

It is therefore always advantageous, but not essential, to avoid any protuberance along the path followed by the air.

The electricity produced by the photoelectric cell 48 may be consumed in order to power any kind of device, and not necessarily a ventilation member 46.

The embodiments described in the present specification are given by way of nonlimiting illustration, and, in the light of this specification, a person skilled in the art can easily modify these embodiments or envisage others, while remaining within the ambit of the invention.

Furthermore, the various characteristics of these embodiments may be used singly or they may be combined with one another. When they are combined, these characteristics may be combined as described above or in other ways, the invention not being limited to the specific combinations described in the present specification. In particular, unless specified to the contrary, a characteristic described with reference to any one embodiment may be applied in analogous manner to any other embodiment.

What is claimed is:

1. An outdoor lighting device comprising at least one light-emitting diode; a housing carrying said light-emitting diode and provided with a heat exchange radiator, said light-emitting diode being thermally coupled with said heat exchange radiator; an air inlet; an air outlet; a covering that covers said heat exchange radiator; and a passage that is protected from solar radiation, said passage being defined between said heat exchange radiator and said covering in such a manner that said heat exchange radiator is arranged along said passage, said passage extending between said air inlet and said air outlet, the device also being configured to create a flow of air in said passage between said air inlet and said air outlet, said housing being arranged in such a manner that said air inlet is situated at a level that is lower than the level of said air outlet, said housing including a base that receives said heat exchange radiator and said light-emitting diode, and said covering comprising both a first element made of a first material extending from said air inlet and a second element made of a second material extending from said air outlet but not extending to the air inlet, wherein the first material is more thermally conductive than the second material.

2. A device according to claim 1, wherein said second element covers a portion of said first element.

3. A device according to claim 1, wherein each of the first and second elements of said covering has folded-down margins whereby said first and second elements are fastened to said base.

4. A device according to claim 1, wherein said air inlet has a first flow cross-section and said air outlet has a second flow cross-section, the first flow cross-section being of greater area than the second flow cross-section.

5. A device according to claim 1, wherein said heat exchange radiator has a first group of heat exchange fins extending in said passage.

6. A device according to claim 5, wherein said fins extend from the air inlet and converge towards the air outlet.

7. A device according to claim 5, wherein said first element has a second group of heat exchange fins interleaved between the fins of the first group of heat exchange fins of the heat exchange radiator.

8. A device according to claim 1, wherein said housing is generally oblong and flat in shape and said housing presents a width that decreases on going from the air inlet towards the air outlet.

9. A device according to claim 1, including a ventilation member that is electrically driven and arranged to establish a flow of air in said passage that is protected from solar radiation.

10. A device according to claim 9, including a photoelectric cell carried by said housing and powering said ventilation member.

11. An outdoor lighting device comprising at least one light-emitting diode; a housing carrying said light-emitting diode and provided with a heat exchange radiator, said light-emitting diode being thermally coupled with said heat exchange radiator; an air inlet; an air outlet; a covering that covers said heat exchange radiator; and a passage that is protected from solar radiation, said passage being defined between said heat exchange radiator and said covering in such a manner that said heat exchange radiator is arranged along said passage, said passage extending between said air inlet and said air outlet, the device also being configured to create a flow of air in said passage between said air inlet and said air outlet, said housing being arranged in such a manner that said air inlet is situated at a level that is lower than the level of said air outlet, said housing including a base that receives said heat exchange radiator and said light-emitting diode, and said covering comprising both a first element made of a first material extending from said air inlet and a second element made of a second material extending from said air outlet but not extending to the air inlet, wherein the first material has a higher light absorbance than the second material.

12. A device according to claim 11, wherein said second element covers a portion of said first element.

13. A device according to claim 11, wherein each of the first and second elements of said covering has folded-down margins whereby said first and second elements are fastened to said base.

14. A device according to claim 11, wherein said air inlet has a first flow cross-section and said air outlet has a second flow cross-section, the first flow cross-section being of greater area than the second flow cross-section.

15. A device according to claim 11, wherein said heat exchange radiator has a first group of heat exchange fins extending in said passage.

16. A device according to claim 15, wherein said fins extend from the air inlet and converge towards the air outlet.

17. A device according to claim 15, wherein said first element has a second group of heat exchange fins interleaved between the fins of the first group of heat exchange fins of the heat exchange radiator.

18. A device according to claim 11, wherein said housing is generally oblong and flat in shape and said housing presents a width that decreases on going from the air inlet towards the air outlet.

19. A device according to claim 11, including a ventilation member that is electrically driven and arranged to establish a flow of air in said passage that is protected from solar radiation.

20. A device according to claim 19, including a photoelectric cell carried by said housing and powering said ventilation member.

21. A device according to claim 11, wherein the first material is more thermally conductive than the second material.

* * * * *